United States Patent
Hashimoto et al.

(10) Patent No.: US 9,429,470 B2
(45) Date of Patent: Aug. 30, 2016

(54) OPTO-ELECTRONIC CONVERTER, IMAGE READING DEVICE, AND IMAGE FORMING APPARATUS

(71) Applicants: Hideki Hashimoto, Kanagawa (JP); Masamoto Nakazawa, Kanagawa (JP)

(72) Inventors: Hideki Hashimoto, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/750,143

(22) Filed: Jun. 25, 2015

(65) Prior Publication Data

US 2016/0003673 A1   Jan. 7, 2016

(30) Foreign Application Priority Data

Jul. 4, 2014  (JP) ................. 2014-139088

(51) Int. Cl.

| | | |
|---|---|---|
| *H04N 1/04* | (2006.01) | |
| *G01J 1/46* | (2006.01) | |
| *H04N 1/028* | (2006.01) | |
| *G01J 1/18* | (2006.01) | |
| *H04N 5/369* | (2011.01) | |
| *H04N 5/378* | (2011.01) | |
| *H04N 9/04* | (2006.01) | |

(Continued)

(52) U.S. Cl.
CPC .. *G01J 1/46* (2013.01); *G01J 1/18* (2013.01); *H04N 1/028* (2013.01); *H04N 5/3692* (2013.01); *H04N 5/378* (2013.01); *H04N 9/045* (2013.01); *G01J 3/2803* (2013.01); *G01J 2001/446* (2013.01)

(58) Field of Classification Search
CPC .. H04N 5/378; H04N 5/37457; H04N 5/335; H04N 5/37455; H04N 9/045; H04N 5/355; H04N 5/217; H04N 5/2351; H04N 5/353; H04N 5/343; H04N 1/40056; H04N 5/23241; H04N 5/3692; H04N 5/3698
USPC ........ 358/513, 514, 518, 505; 348/308, 241, 348/300, 229.1, 222.1, 302, 294, 243, 297, 348/340, 220.1, 223.1, 248, 311; 381/312, 381/317, 321; 382/132; 385/3, 8
See application file for complete search history.

(56) References Cited

U.S. PATENT DOCUMENTS 4,663,654 A * 5/1987 Morrison ................. H04N 9/44
                                            348/509
5,218,447 A * 6/1993 Hideo ................. H04N 9/7921
                                            386/201

(Continued)

FOREIGN PATENT DOCUMENTS

| JP | 11-088898 | 3/1999 |
|---|---|---|
| JP | 2010-259109 | 11/2010 |
| JP | 2013-038625 | 2/2013 |

*Primary Examiner* — Negussie Worku
(74) *Attorney, Agent, or Firm* — Oblon, McClelland, Maier & Neustadt, L.L.P.

(57) ABSTRACT

An opto-electronic converter includes a plurality of light-receiving elements configured to convert light of different colors into analog signals, each of the analog signals representing a pixel, an amplifier unit configured to amplify the analog signals, into which the light is converted by the light-receiving elements, in each pixel group, the pixel group including a plurality of the light-receiving elements, the plurality of light-receiving elements converting light of different colors, and a gain switch unit configured to switch, for each of the light-receiving elements included in the pixel group, a gain of the amplifier unit to a gain determined in advance depending on a color of the light converted by the light-receiving element.

9 Claims, 13 Drawing Sheets

(51) Int. Cl.
*G01J 1/44* (2006.01)
*G01J 3/28* (2006.01)

(56) References Cited

U.S. PATENT DOCUMENTS

| | | | | |
|---|---|---|---|---|
| 5,579,118 A * | 11/1996 | Bae | ........................ | H04N 5/783 |
| | | | | 386/300 |
| 6,185,359 B1 * | 2/2001 | Gedl | ...................... | H04N 5/783 |
| | | | | 386/230 |
| 6,262,762 B1 * | 7/2001 | Gunzel | .................. | H04N 5/253 |
| | | | | 348/97 |
| 6,405,164 B1 * | 6/2002 | Pinai | .................... | H03G 1/0088 |
| | | | | 381/23.1 |
| 6,466,265 B1 * | 10/2002 | Lee | ...................... | H04N 3/1512 |
| | | | | 348/308 |
| 6,747,695 B1 * | 6/2004 | Afghahi | ................. | H04N 5/361 |
| | | | | 348/241 |
| 6,888,568 B1 * | 5/2005 | Neter | ................... | H04N 3/1562 |
| | | | | 348/222.1 |
| 7,133,073 B1 * | 11/2006 | Neter | ................... | H04N 5/3454 |
| | | | | 348/222.1 |
| 8,310,577 B1 * | 11/2012 | Neter | ................... | H04N 5/365 |
| | | | | 348/308 |
| 8,885,084 B2 * | 11/2014 | Egawa | .................. | H04N 5/355 |
| | | | | 348/300 |
| 2011/0051201 A1 | 3/2011 | Hashimoto et al. | | |
| 2014/0097328 A1 * | 4/2014 | Levine | ................ | H04N 5/2351 |
| | | | | 250/208.1 |
| 2014/0204432 A1 * | 7/2014 | Hashimoto | ........ | H04N 1/00798 |
| | | | | 358/475 |

\* cited by examiner

Vreft: TOP REFERENCE VOLTAGE FOR ADC
Vrefb: BOTTOM REFERENCE VOLTAGE FOR ADC
R_PGAout: R IMAGE SIGNAL OUTPUT FROM PGA
G_PGAout: G IMAGE SIGNAL OUTPUT FROM PGA

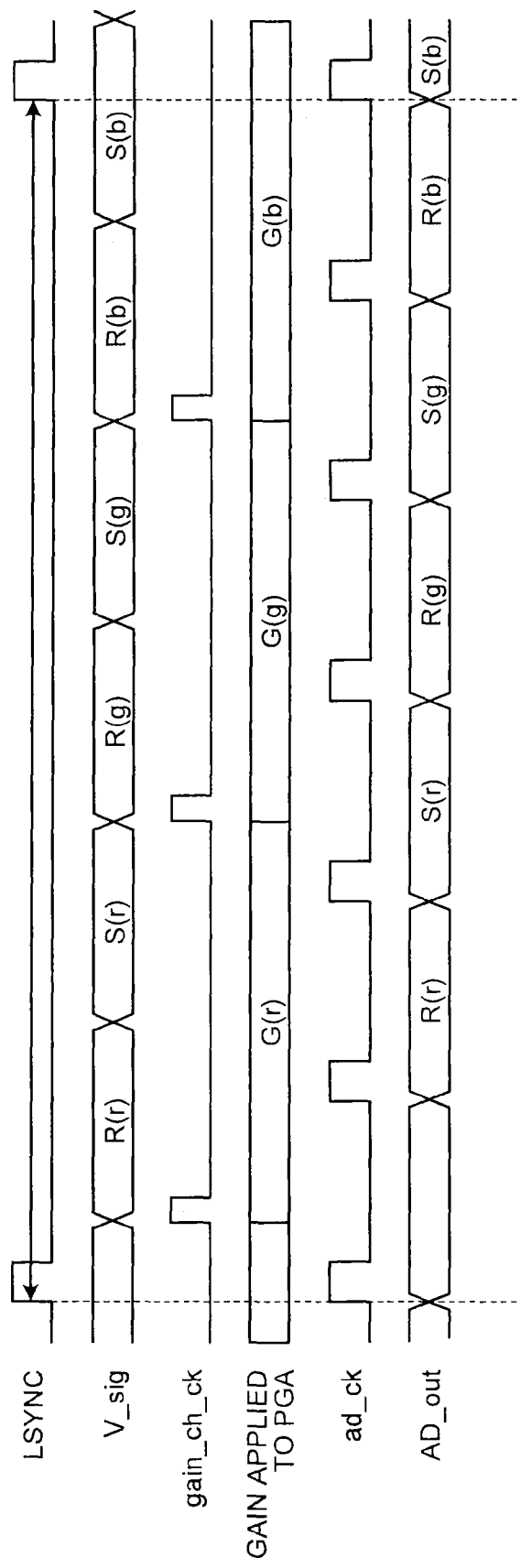

Vreft: TOP REFERENCE VOLTAGE FOR ADC
Vrefb: BOTTOM REFERENCE VOLTAGE FOR ADC
R_PGAout: R IMAGE SIGNAL OUTPUT FROM PGA

OPTO-ELECTRONIC CONVERTER, IMAGE READING DEVICE, AND IMAGE FORMING APPARATUS

CROSS-REFERENCE TO RELATED APPLICATIONS

The present application claims priority to and incorporates by reference the entire contents of Japanese Patent Application No. 2014-139088 filed in Japan on Jul. 4, 2014.

BACKGROUND OF THE INVENTION

1. Field of the Invention

The present invention relates generally to opto-electronic converters, image reading devices, and image forming apparatuses.

2. Description of the Related Art

In recent years, CMOS (complementary metal oxide semiconductor) image sensors are increasingly used as image sensors in place of CCDs (charge coupled devices). This is because a dedicated process is required to manufacture pixels of a CCD and a plurality of power supply voltages is required to use the CCD. Further, because the CCD requires that a plurality of peripheral ICs (integrated circuits) be operated in coordination with the CCD, system complexity considerably increases. However, CMOS image sensors overcome these disadvantages.

CMOS image sensors can be manufactured using a manufacturing process similar to that for manufacturing general CMOS integrated circuits. Furthermore, a CMOS image sensor can be driven with a single power supply. Furthermore, a CMOS image sensor can be formed on a same chip together with analog circuitry and logic circuitry using a CMOS manufacturing process. Thus, CMOS image sensors provide considerable advantages including reduction in the number of peripheral ICs and allow reduction power consumption and size. For these reasons, CMOS image sensors come into wide use in mobile phones and digital cameras.

Mainstream CMOS image sensors have a column-based architecture including an FD (floating diffusion) amplifier for each pixel and an ADC (analog-to-digital converter) for each column of a pixel array, and configured to select one row from the pixel array, read out the row simultaneously in the direction of the column, and output pixel signals as digital signals.

A known type of CMOS linear sensors includes pixels of R (red), G (green), and B (blue), arranging in the main-scanning direction, and a processing circuit for processing three pixels R, G, and B as one column, and processing a signal output from each pixel in the order of R, G, and B.

Japanese Laid-open Patent Application No. 2010-259109 discloses a semiconductor device including a signal obtaining unit, amplifier circuits, and unit-signal detecting units. The signal obtaining unit includes unit elements arranged in a two-dimensional matrix of horizontal rows and vertical columns. Each of the unit elements includes a unit-signal generator configured to generate a unit signal corresponding to a signal charge generated by a charge generator. Each of the amplifier circuits is configured to amplify the unit signals read out from the unit elements by a gain applied to the amplifier circuit. Each of the unit-signal detecting units is configured to detect magnitude of the unit signals of one of vertical columns output from the signal obtaining unit and not yet, input to the amplifier circuit. Gains, each for a single column, to be applied to the amplifier circuits are individually determined based on detection results output from the unit-signal detecting units. Each of the amplifier circuits is operated using a corresponding one of the thus-determined gains.

However, in an image sensor where each column includes three pixels R, G, and B, if outputs of the R, G, and B pixels are amplified by a same PGA (programmable gain amplifier) and thereafter A/D-converted, signal levels of the outputs can vary from one color to another due to spectral characteristics of color filters of the pixels, a light source, and the like. This variation can disadvantageously narrow A/D-conversion dynamic range of a color of low output level. In that case, because the number of bits of conversion of an A/D converter is not effectively utilized, the gradation can deteriorate.

Even if a gain of the PGA is switched to a gain appropriate for a color of an image signal being output, influence of charge injection (injected charge) that occurs at the gain switching causes the potential across a capacitor that determines the gain to fluctuate. Accordingly, the need of waiting for the fluctuation to converge before amplifying the image signal arises, which can be a bottleneck for high-speed image reading.

In view of the above, there is a need for an opto-electronic converter, an image reading device, and an image forming apparatus capable of, even if levels of signals output and opto-electronically converted by a plurality of light-receiving elements included in a pixel group vary from one color to another of received light, adjusting the signal levels to appropriate levels on a per-color basis.

SUMMARY OF THE INVENTION

It is an object of the present invention to at least partially solve the problems in the conventional technology.

There is provided an opto-electronic converter that includes a plurality of light-receiving elements configured to convert light of different colors into analog signals, each of the analog signals representing a pixel, an amplifier unit configured to amplify the analog signals, into which the light is converted by the light-receiving elements, in each pixel group, the pixel group including a plurality of the light-receiving elements, the plurality of light-receiving elements converting light of different colors, and a gain switch unit configured to switch, for each of the light-receiving elements included in the pixel group, a gain of the amplifier unit to a gain determined in advance depending on a color of the light converted by the light-receiving element.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a timing diagram illustrating a first exemplary operation of the opto-electronic converter in which the gain switch unit operates;

DETAILED DESCRIPTION OF THE PREFERRED EMBODIMENTS

Exemplary embodiments of the present invention are described below with reference to the accompanying drawings.

Figure 1:
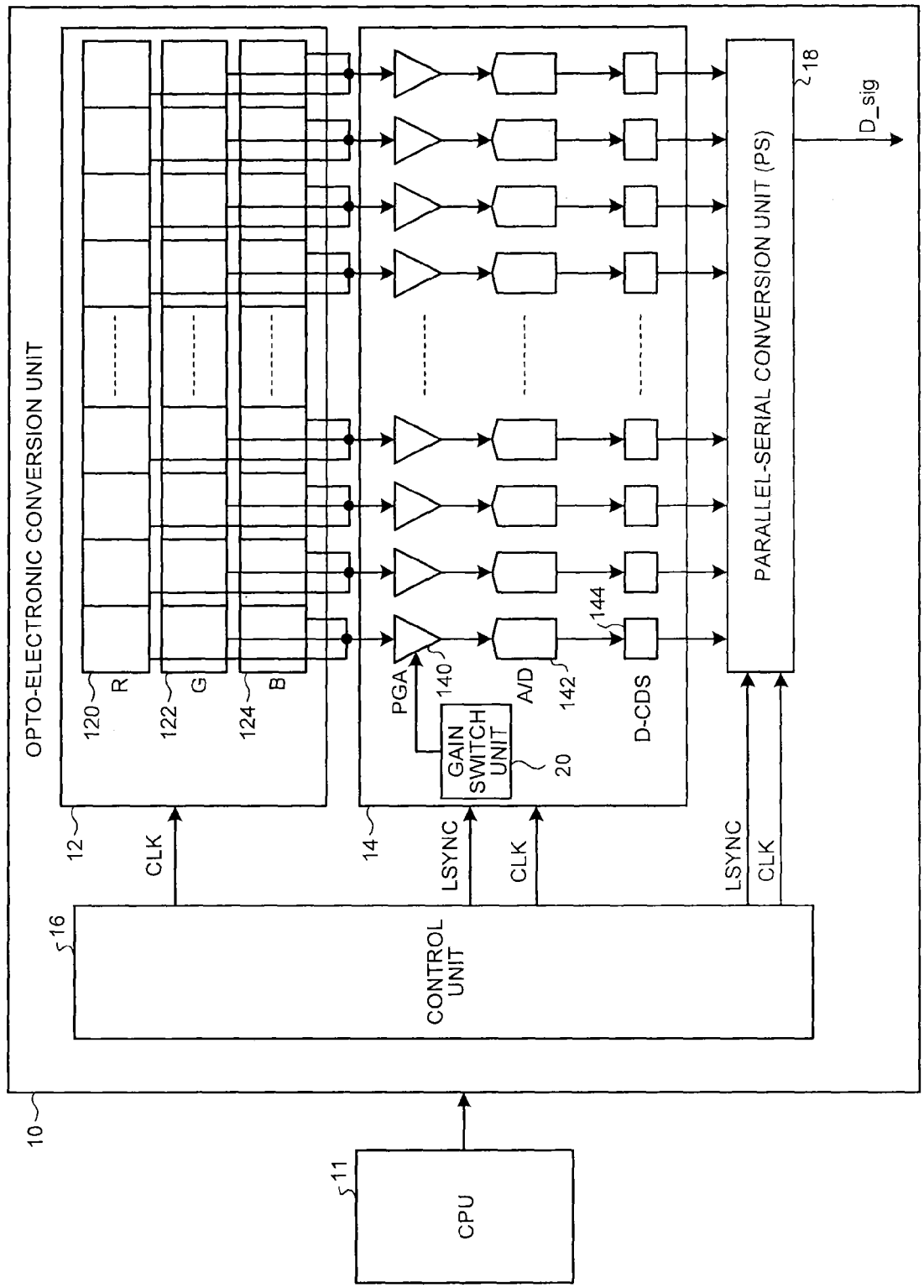
FIG. 1 is a diagram illustrating an opto-electronic converter according to a first embodiment and elements therearound.

An opto-electronic converter according to a first embodiment is described below. FIG. 1 is a diagram illustrating an opto-electronic converter 10 according to the first embodiment and elements therearound. The opto-electronic converter 10 is a CMOS linear sensor including, for example, an opto-electronic conversion unit 12, a signal processing unit 14, a control unit (timing control unit) 16, and a parallel-serial conversion unit (PS) 18. Operations of the opto-electronic converter 10 are controlled by a CPU (central processing unit) 11.

The opto-electronic conversion unit 12 includes N light-receiving elements (photodiodes) 120, N light-receiving elements 122, and N light-receiving elements 124 arranged in parallel rows of R, G, and B, respectively. The opto-electronic converter 10 is configured such that a single column (pixel group) includes three light-receiving elements, one each of the light-receiving elements 120, 122, and 124 for receiving R light, G light, and B light, respectively, and outputs signals obtained by converting light into electrical signals one column by one column. Each of the light-receiving elements 120, 122, and 124 converts light reflected from an original document into an electrical signal and outputs it as an analog (image) signal representing a pixel.

The signal processing unit 14 includes N PGAs (programmable gain amplifiers: amplifier units) 140, N A/Ds (A/D converters) 142, N D-CDSs (digital CDS units) 144, and a gain switch unit 20. The signal processing unit 14 amplifies analog signals output from the opto-electronic conversion unit 12 one column by one column, converts the analog signals into digital (image) signals, corrects the signals by CDS (correlated double sampling), and outputs the corrected signals.

The PGA 140 is provided for each of the pixel groups. The PGA 140, the gain of which is switched by the gain switch unit 20, amplifies the analog image signals within a dynamic range of the A/D converter 142. The gain switch unit 20 switches the gain of the PGA 140 to a gain determined in advance depending on a color of light received and converted into an electrical signal by the light-receiving element 120, 122, or 124 for each of the pixel groups (each including the light-receiving elements 120, 122, and 124).

The A/D converter 142 converts the analog image signals output from the PGA 140 to digital signals and outputs the digital signals to the CDS unit 144. The CDS unit 144 performs CDS operations including calculating a difference between a reset level (a feedthrough, reference level) of the opto-electronic conversion unit 12 and a signal level corresponding to a charge accumulated on each pixel (each of the light-receiving elements 120, 122, and 124) indicated by the digital signals fed from the A/D converter 142 and outputting the difference. The parallel-serial conversion unit 18 serializes digital signals processed in parallel in the plurality of columns and output therefrom, and outputs the serialized digital signals downstream. The control unit 16 generates signals necessary for driving the elements of the opto-electronic converter 10.

Although in the example illustrated in FIG. 1, the CMOS linear sensor has the column-based architecture for processing a plurality of signals in parallel, the CMOS linear sensor may alternatively be configured to perform a single linear processing. Although the three-pixel-per-column architecture in which the single PGA 140, the single A/D converter 142, and the single CDS unit 144 are provided for each column including three pixels (each of R, G, and B) is illustrated in the example, employable architecture is not limited thereto. Alternatively, six-pixel-per-column architecture or the like may be employed. Although the opto-electronic converter 10 is configured to perform CDS on digital data converted by the A/D converter 142 in the illustrated example, alternatively, pixel-level CDS may be performed using an analog signal of a reset level and an analog signal of a signal level both amplified by the PGA 140.

Figure 2:
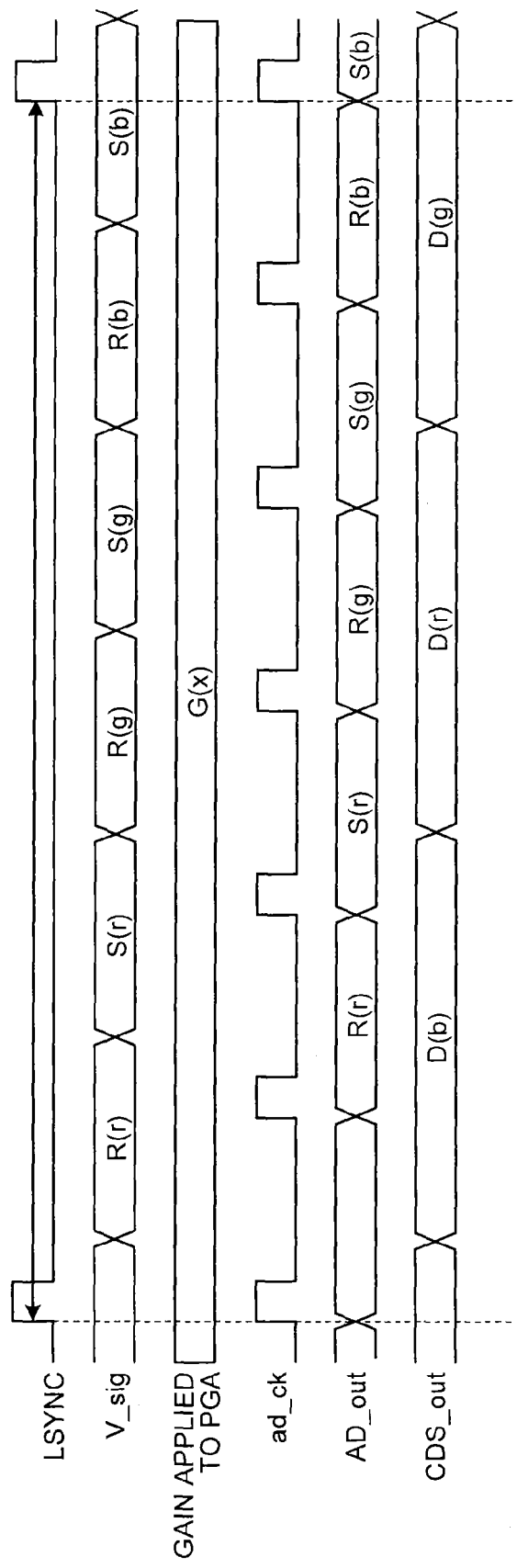
FIG. 2 is a timing diagram illustrating how the opto-electronic converter operates when a gain switch unit is not utilized.

FIG. 2 is a timing diagram illustrating how the opto-electronic converter 10 operates when the gain switch unit 20 is not utilized. As illustrated in FIG. 2, the opto-electronic conversion unit 12 outputs reset levels for use as reference levels of the pixels and signal levels corresponding to charges accumulated on each of the light-receiving elements 120, 122, and 124 in the following order: R(r), S(r), R(g), S(g), R(b), and R(b), where R(r) is the reset level of R, S(r) is the signal level of R, R(g) is the reset level of G, S(g) is the signal level of G, R(b) is the reset level of B, and S(b) is the signal level of B.

The PGA 140 amplifies each of signals, which are output one by one from the opto-electronic conversion unit 12 and represents pixels, by a given gain G(x), and outputs the amplified signals to the A/D converter 142. The A/D converter 142 converts the analog signals fed from the PGA 140 one by one into digital signals. The CDS unit 144 performs CDS correction on the digital signals converted by the A/D converter 142 by calculating differences between reset levels and signal levels, and outputs CDS-corrected image data D(r), D(g), and D(b). The parallel-serial conversion unit 18 serializes the image data processed in the plurality of pixel groups (the plurality of columns) in parallel and output therefrom, and outputs the serialized image data at a later stage.

Figure 3:
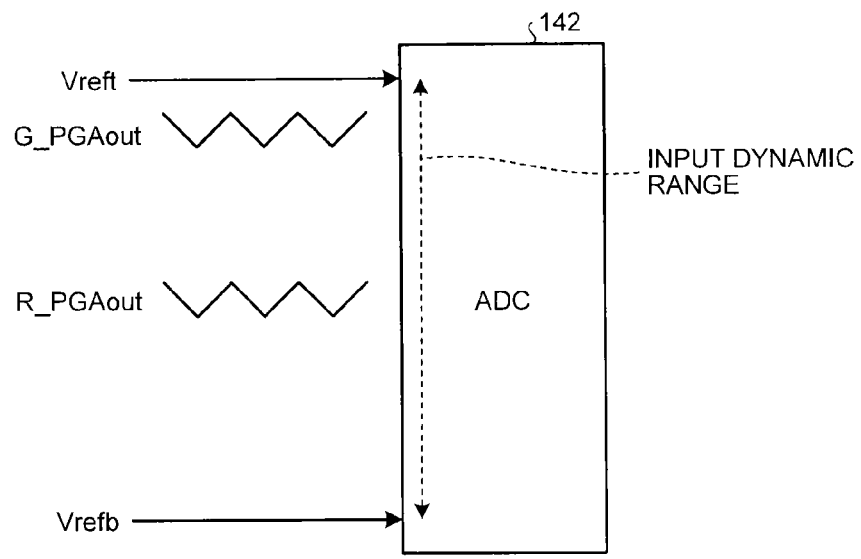
FIG. 3 is a diagram illustrating levels of signals output from a PGA when the gain switch unit does not operate.

FIG. 3 is a diagram illustrating signal levels output from the PGA 140 (i.e., signal levels input to the A/D converter 142) when the gain switch unit 20 does not operate. An image reading device such as a scanner typically determines, at power-on or at recovery from an energy-saving mode, a gain, by which a signal output from an opto-electronic converter is to be amplified, of a PGA depending on a reference level obtained by reading a reference white plate so that the gain allows making effective use of a dynamic range of an A/D converter.

In an image reading device, signal levels output from R, G, and B pixels can vary due to spectral characteristics of a light source that irradiates an original document with light, an optical system such as a mirror and a lens, color filter of each pixel of the opto-electronic converter 10, and the like, even if the reference white is read. In the opto-electronic converter 10 in which the gain switch unit 20 does not operate, the PGA 140 amplifies outputs of the R, G, B pixels by the fixed gain G(x). As a result, as illustrated in FIG. 3, although a dynamic range of the A/D converter 142 can be effectively used for G, the dynamic range of the A/D converter 142 cannot be effectively used for R.

To alleviate this problem, the opto-electronic converter 10 causes the gain switch unit 20 to operate and to switch the gain of the PGA 140 depending on a color of light received by the light-receiving element 120, 122, or 124.

Figure 4:
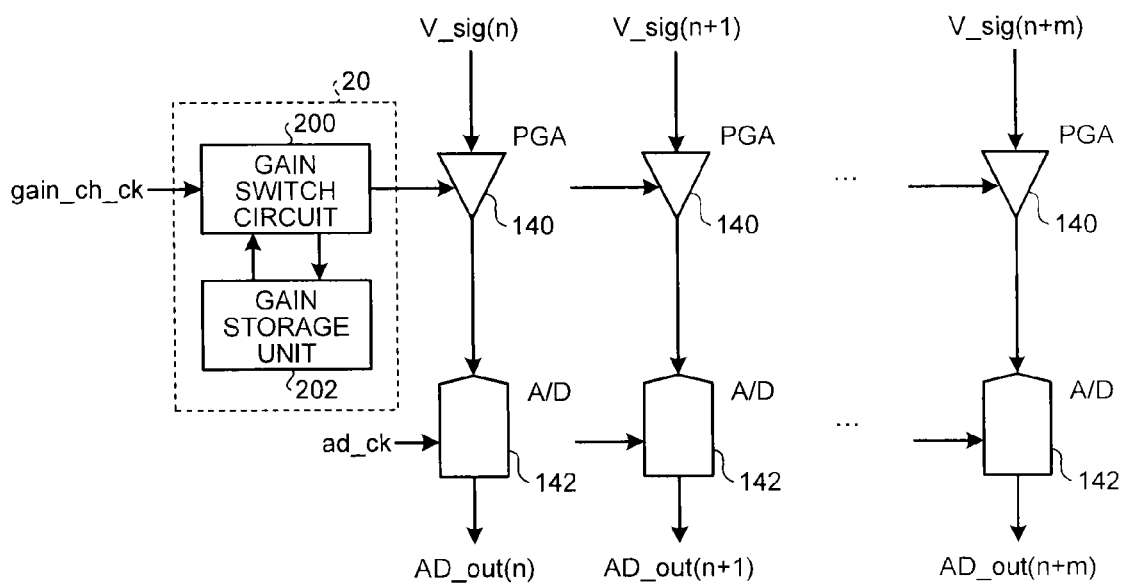
FIG. 4 is a diagram illustrating a configuration of the gain switch unit and elements therearound.

The gain switch unit 20 is described in detail below. FIG. 4 is a diagram illustrating a configuration of the gain switch unit 20 and elements therearound. The gain switch unit 20 may include a gain switch circuit 200 and a gain storage unit 202, for example. The gain switch circuit 200 switches the gain of the PGA 140 in accordance with gain information stored in the gain storage unit 202 when, for example, a gain switch signal (gain_ch_ck) output from the control unit 16 is enabled.

The gain storage unit 202 stores the gain information corresponding to gains which depend on a level of a signal output from the light-receiving element 120, 122, or 124 and which are determined in advance for each of the colors. For instance, the opto-electronic converter 10 may include an AGC (automatic gain control: hardware or software (not shown)) that determines, at power-on or at recovery from an energy-saving mode of an image reading device where the opto-electronic converter 10 is mounted, a gain of the PGA 140 so that a level obtained by reading a reference white plate reaches a preset value. The gain storage unit 202 stores the gain information corresponding to the gains determined for each of colors by the AGC, for instance.

FIG. 5 is a timing diagram illustrating a first exemplary operation of the opto-electronic converter 10 in which the gain switch unit 20 operates. In a condition where the opto-electronic conversion unit 12 outputs signals in the following order: R(r), S(r), R(g), S(g), R(b), and R(b), where R(r) is the reset level of R, S(r) is the signal level of R, R(g) is the reset level of G, S(g) is the signal level of G, R(b) is the reset level of B, and S(b) is the signal level of B, upon receiving from the control unit 16 the gain switch signal (gain_ch_ck) that enables the gain switch unit 20 at an instant when the reset level of each pixel is output, the gain switch unit 20 switches the gain of the PGA 140 depending on a color of light received by the light-receiving element 120, 122, or 124.

Figure 6A:
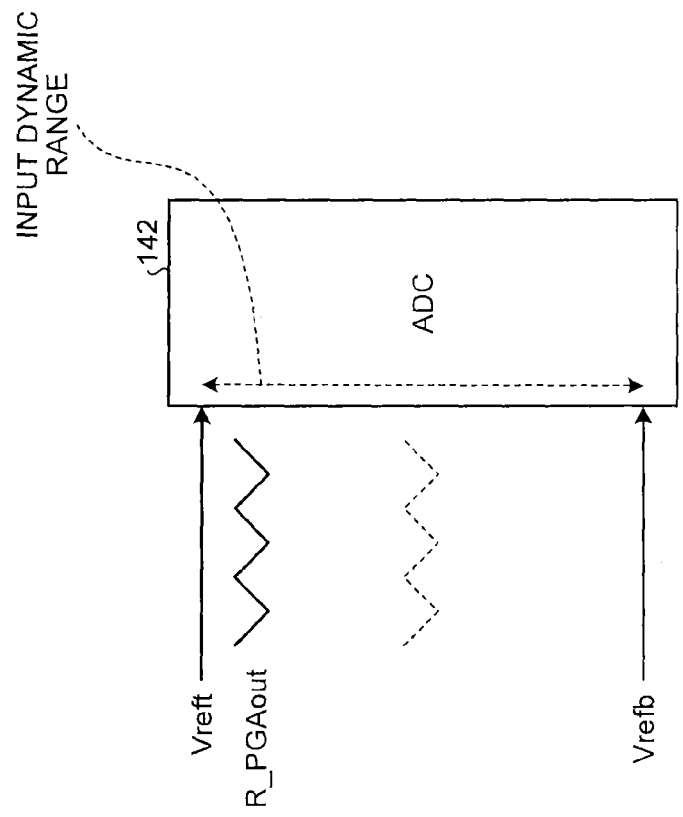
FIG. 6A and FIG. 6B are diagrams illustrating an example of an output of the PGA in the opto-electronic converter in which the gain switch unit does not operate and that in which the gain switch unit operates.

FIG. 6 is a diagram illustrating an example of an output of the PGA 140 in the opto-electronic converter 10 in which the gain switch unit 20 does not operate and that in which the gain switch unit 20 operates. In the opto-electronic converter 10 in which the gain switch unit 20 does not operate, as illustrated in FIG. 6A, even if the PGA 140 amplifies a signal output from the light-receiving element 120 that receives R light, a level of the output signal of the PGA 140 is low with respect to an input dynamic range of the A/D converter 142.

Figure 6B:
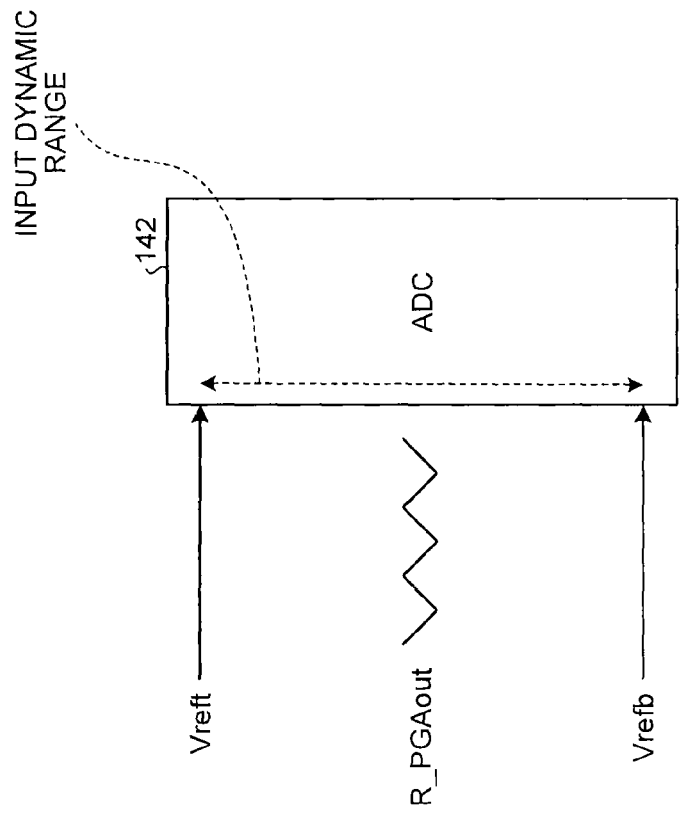

By contrast, in the opto-electronic converter 10 in which the gain switch unit 20 operate, as illustrated in FIG. 6B, the PGA 140 amplifies a signal output from the light-receiving element 120 that receives R light to appropriately adjust a level of signal output from the PGA 140 to the input dynamic range of the A/D converter 112.

More specifically, the opto-electronic converter 10 actuates the gain switch unit 20, thereby applying a gain for R at an instant when the reset level of R is output from the opto-electronic conversion unit 12, a gain for G at an instant when the reset level of G is output from the same, and a gain for B at an instant when the reset level of B is output from the same. Accordingly, even when levels of electrical signals output, by receiving light and converting the light into the signals, from the light-receiving elements 120, 122, and 124 included in a pixel group vary from one color to another of the received light, the opto-electronic converter 10 can adjust the signal levels on a per-color basis appropriately so that the dynamic range (the number of bits of conversion) of the A/D converter 142 is effectively used and a high gradation is obtained.

Figure 7:
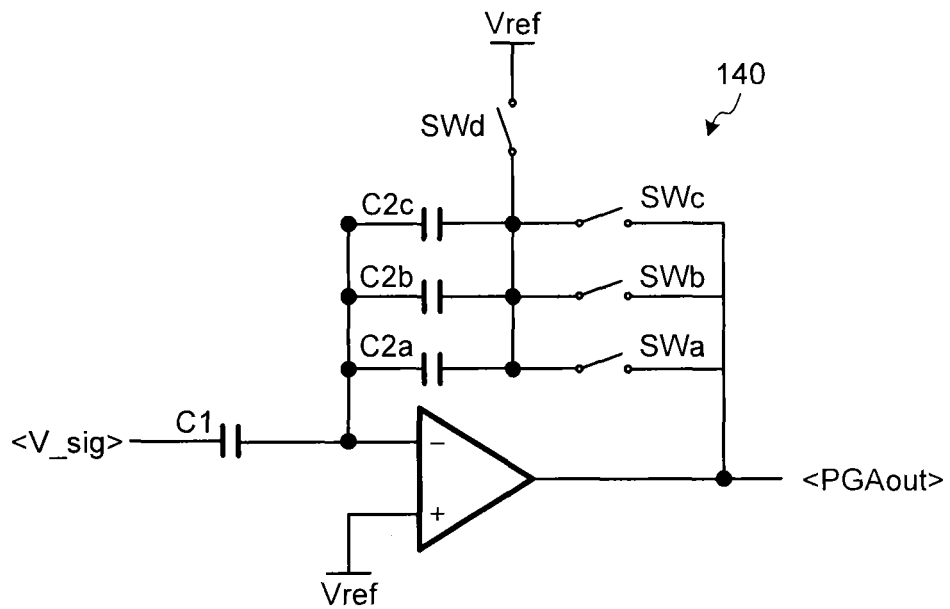
FIG. 7 is a diagram illustrating an example configuration of the PGA.

FIG. 7 is a diagram illustrating an example configuration of the PGA 140. The gain of the PGA 140 is determined on the basis of a ratio of capacitance between a capacitor C1 and a capacitor C2* (* represents any one of a, b, and c). The capacitors C2a, C2b, and C2c are different from each other in capacitance. The gain of the PGA 140 is determined by switching on/off states of switches SW* (* represents any one of a, b, and c). For instance, if the switch SWb turns on in a condition where the capacitance of the capacitor C2b is twice as large as that of the capacitor C1, the gain is set to 2. Meanwhile, Vref is reference voltage of the PGA 140.

Figure 8A:
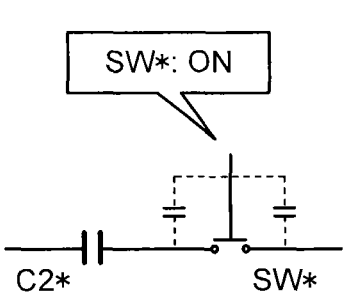
FIGS. 8A and 8B are diagrams illustrating charge injection caused by switching at the PGA.
Figure 8B:
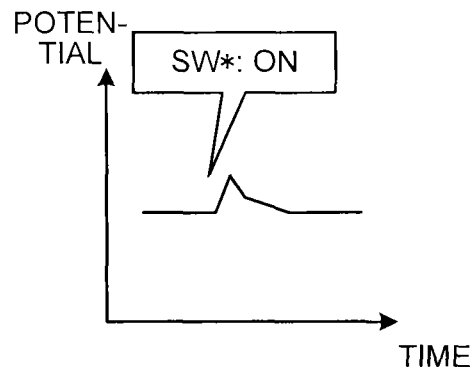

When the switch SW* is switched on as illustrated in FIG. 8A to switch the gain of the PGA 140, charge injection occurs at the switching. The charge injection causes the potential across the capacitor C2* that determines the gain of the PGA 140 to fluctuate as illustrated in FIG. 8B.

Figure 9C:
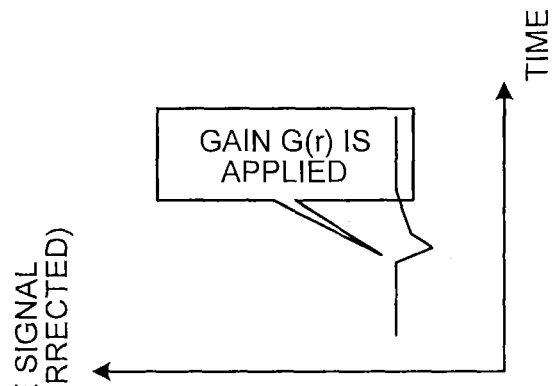
FIGS. 9A, 9B, and 9C are diagrams illustrating a reset level, a signal level, and an image signal obtained in the opto-electronic converter performing the first exemplary operation.
Figure 9B:
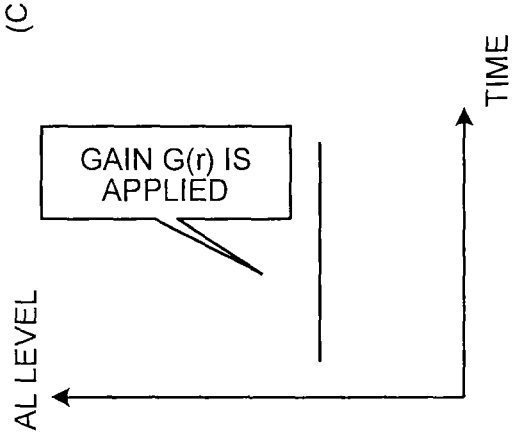
Figure 9A:
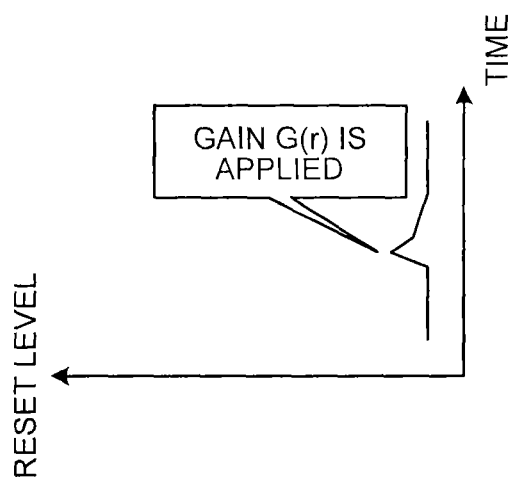

If the gain of the PGA 140 is switched on at an instant when a signal of reset level of each color is output from the opto-electronic conversion unit 12 as illustrated in FIG. 5, although the reset level is affected by the noise as illustrated in FIG. 9A, the signal level is not affected by the noise as illustrated in FIG. 9B. As for the PGA 140, if CDS is performed by the CDS unit 144 using this reset level and this signal level, the image signal is affected by the noise as illustrated in FIG. 9C. Thus, when the opto-electronic converter 10 operates in accordance with the first exemplary operation illustrated in FIG. 5, the PGA 140 must stop amplifying the image signals until the influence of the fluctuation caused by the charge injection converges, which makes it difficult to achieve high-speed image reading.

Figure 10:
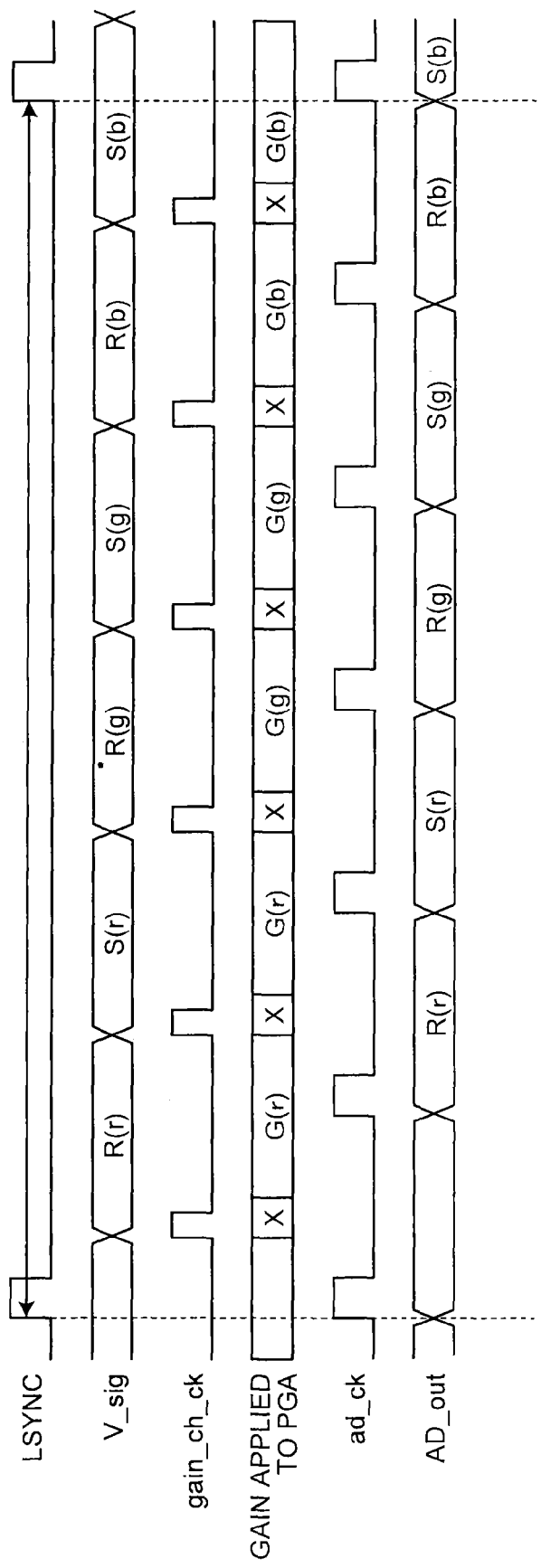
FIG. 10 is a timing diagram illustrating a second exemplary operation of the opto-electronic converter which the gain switch unit operates.

FIG. 10 is a timing diagram illustrating a second exemplary operation of the opto-electronic converter 10 in which the gain switch unit 20 operates. In the second exemplary operation, the opto-electronic converter 10 operates so that the control unit 16 enables the gain switch signal (gain_ch_ck) at an instant when any one of a reset level and a signal level of each of the R, G, and B pixels is output from the opto-electronic conversion unit 12.

When the gain switch signal is enabled, the gain switch unit 20 temporarily applies a predetermined fixed gain X, and thereafter applies a gain which depends on a color defined in the gain information stored in the gain storage unit 202. Meanwhile, the gain switch unit 20 preferably sets the fixed gain X to be temporarily applied at start of gain switching to a value close to a mean value of applicable gains. For instance, if gains applicable to the PGA 140 are 1, 2, and 4, the fixed gain X is preferably set to 2, which is close to the mean value of the applicable gains.

Figure 11:
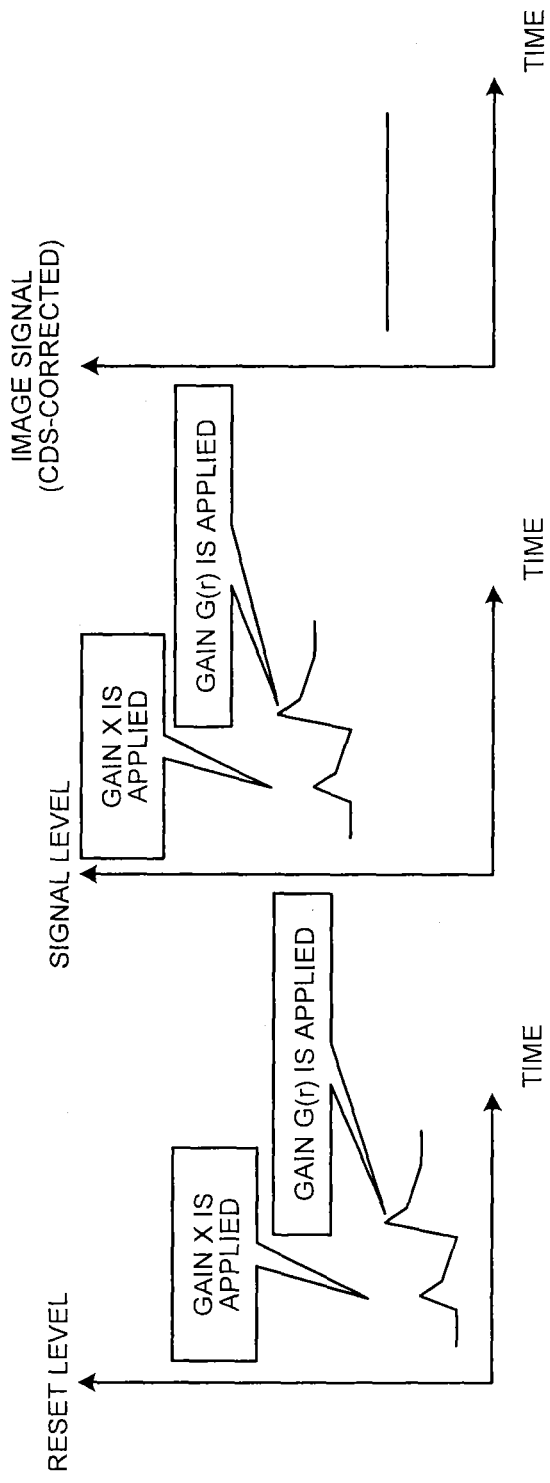
FIGS. 11A, 11B, and 11C are diagrams illustrating a reset level, a signal level, and an image signal obtained in the opto-electronic converter performing the second exemplary operation.

FIGS. 11A, 11B, and 11C are diagrams illustrating a reset level, a signal level, and an image signal obtained in the opto-electronic converter 10 performing the second exemplary operation. When the opto-electronic converter 10 operates as illustrated in FIG. 10, the reset potential level fluctuates when the fixed gain X is applied to the PGA 140 and when a gain G(r), which depends on a color, is applied to the PGA 140 as illustrated in FIG. 11A. As illustrated in FIG. 11B, the signal potential level fluctuates as well when the fixed gain X is applied to the PGA 140 and when the gain G(r), which depends on a color, is applied to the PGA 140.

Accordingly, when the opto-electronic converter 10 operates as illustrated in the second exemplary operation, the CDS unit 144 that outputs the difference between the signal level and the reset level as the image signal cancels the influence of the fluctuation as illustrated in FIG. 11C.

Thus, when the opto-electronic converter 10 operates as illustrated in the second exemplary operation, the influence of the noise caused by gain switching can be avoided without waiting for amplifying the image signal until the influence of the fluctuation caused by charge injection converges. Accordingly, the opto-electronic converter 10 can output an image with a high gradation by making effective use of the number of bits of conversion of the A/D converter 142 without sacrificing image-reading speed.

Furthermore, the opto-electronic converter 10 sets the fixed gain X, which is temporarily applied at start of the gain switching, to a value close to the mean value described above, thereby reducing a period of time to be necessary for until switching operation is stabilized. For instance, the opto-electronic converter 10 switches the gain G(r) for R from 2 to 4, rather than from 1 to 4, so that charges are stored in a capacitor to attain the gain of 4 in a shorter period of time, thereby reducing the period of time to be necessary for until the operation is stabilized.

Figure 12:
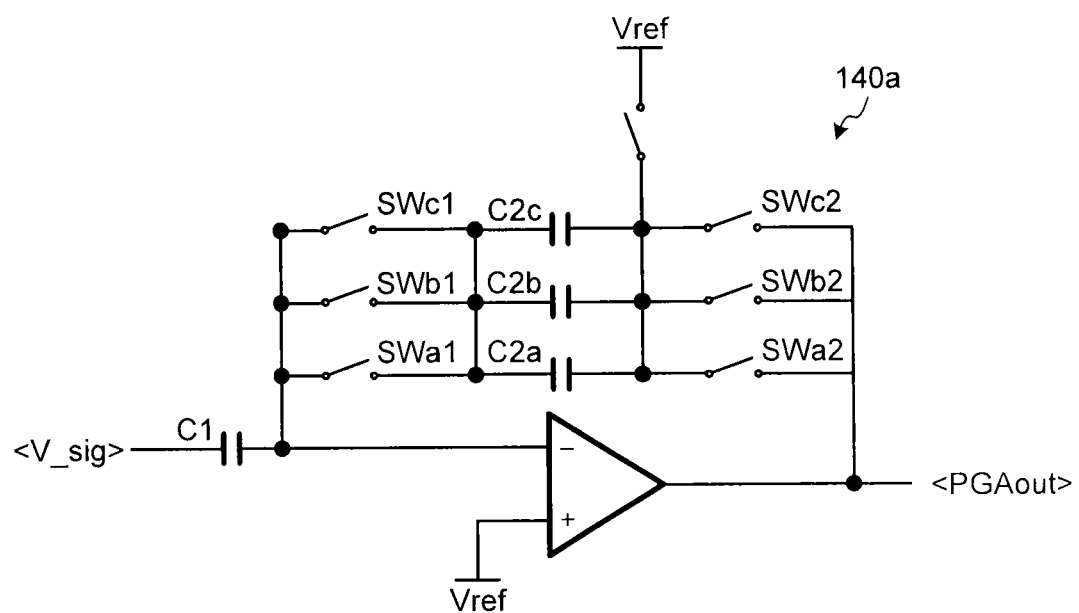
FIG. 12 is a diagram illustrating a configuration of a modification of the PGA.

FIG. 12 is a diagram illustrating a configuration of a PGA 140a, which is a modification of the PGA 140. As illustrated in FIG. 12, the PGA 140a includes switches SW*1 and SW*2 (* represents any one of a, b, and c) which are identical in size and arranged at both ends of the capacitor C2* having different capacitances, which determine respective gains.

Figure 13:
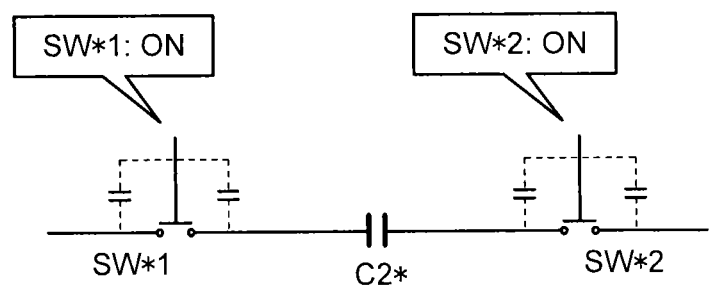
FIG. 13 is a diagram illustrating switching at the modification of the PGA.

The gain switch unit 20 performs gain switching by switching from one of the capacitors C2* to another by substantially simultaneously switching on or off the two switches (the SW*1 and the SW*2) connected to an upstream side and a downstream side of each of the capacitors C2* of the PGA 140a as illustrated in FIG. 13. The PGA 140a thus causes similar charge injections to occur on both sides of the capacitor C2* at gain switching, thereby suppressing fluctuation in the signal level.

Figure 14A:
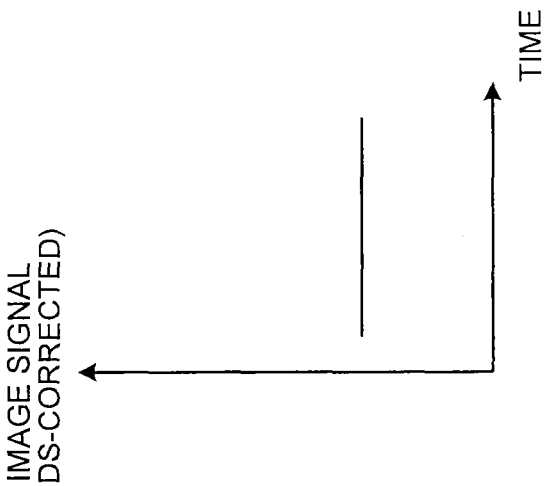
FIGS. 14A, 14B, and 14C are diagrams illustrating a reset level, a signal level, and an image signal obtained in the opto-electronic converter including the modification of the PGA.
Figure 14B:
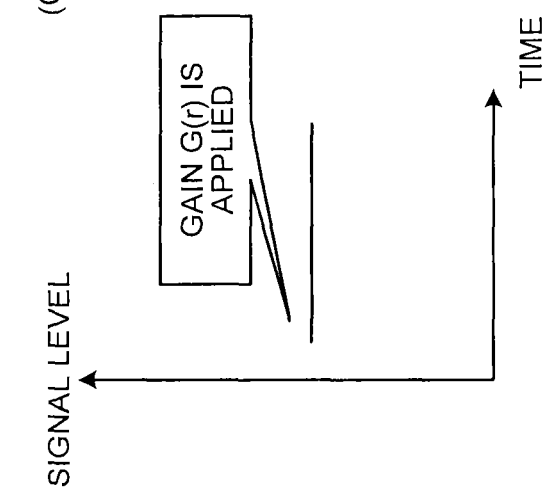
Figure 14C:
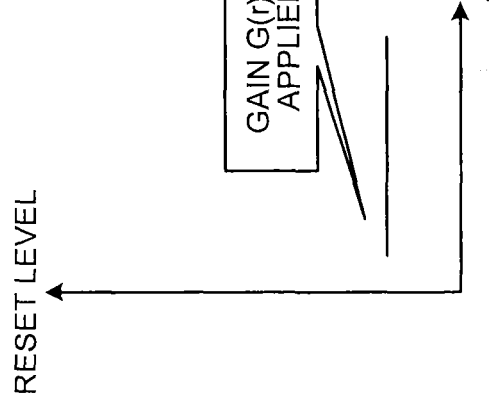

The PGA 140a provides the following advantage. As illustrated in FIG. 14A, even when a gain G(r) which depends on a color is applied to the PGA 140a, a reset potential level does not fluctuate. As illustrated in FIG. 14B, even when the gain G(r) which depends on the color is applied to the PGA 140a, a signal potential level also does not fluctuate. Accordingly, the opto-electronic converter 10 including the PGA 140a can prevent fluctuation in a level of an image signal as illustrated in FIG. 14C even when gain switching is performed. Because it is not necessary to wait for converging the influence of the fluctuation, an image with a large number of gray levels can be output without sacrificing image-reading speed.

Figure 15:
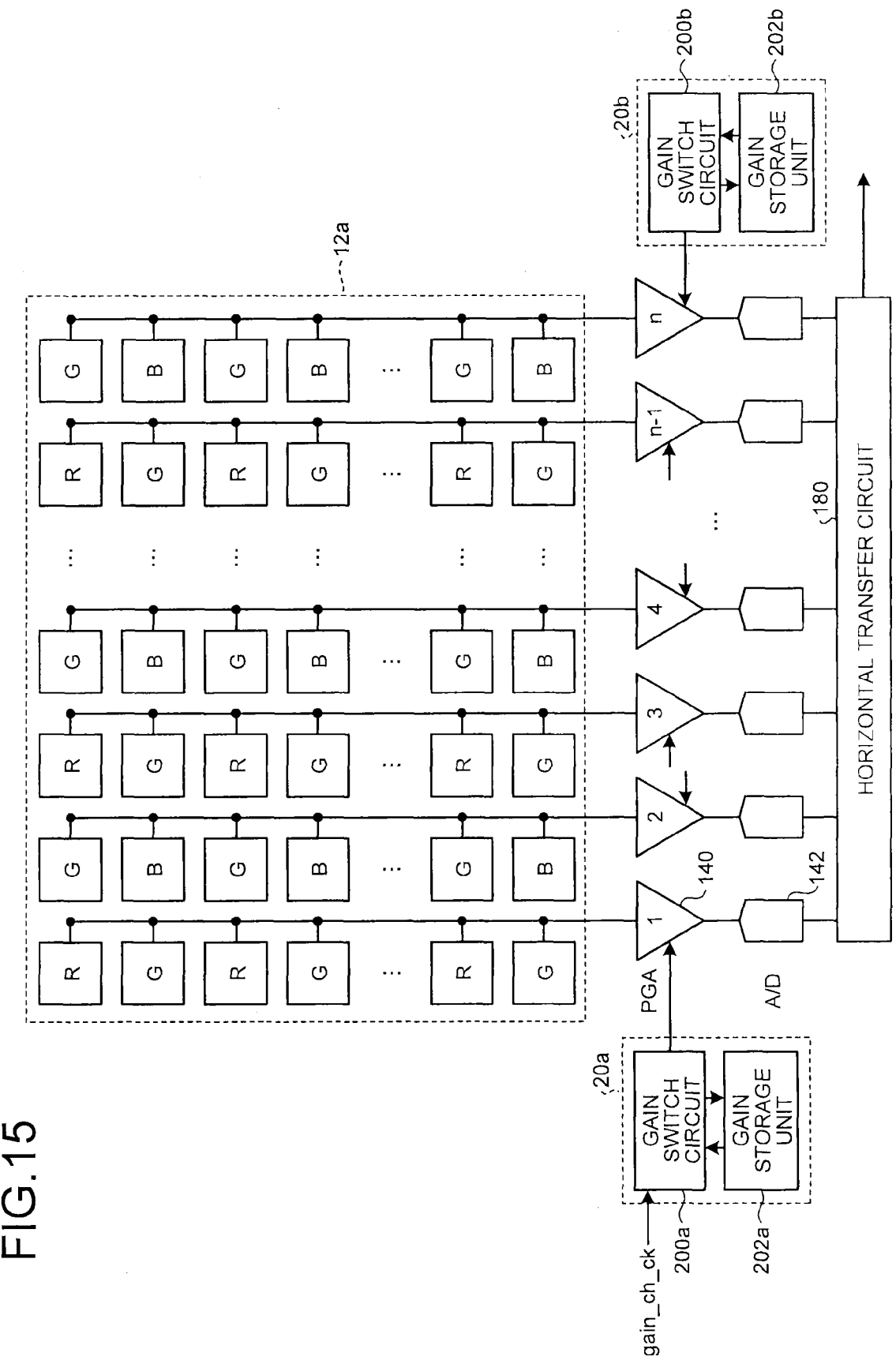
FIG. 15 is a diagram illustrating an overview of an opto-electronic converter according to a second embodiment.

An opto-electronic converter according to a second embodiment is described below. FIG. 15 is a diagram illustrating an overview of the opto-electronic converter according to the second embodiment. The opto-electronic converter according to the second embodiment is an area sensor having a column-based architecture and may include, for example, an opto-electronic conversion unit 12a, the PGAs 140 the number of which is n, the A/D converters 142 the number of which is n, a horizontal transfer circuit 180, a gain switch unit 20a, and a gain switch unit 20b. The gain switch unit 20a and the gain switch unit 20b operate in synchronization with each other. The gain switch unit 20a includes a gain switch circuit 200a and a gain storage unit 202a. The gain switch unit 20b includes a gain switch circuit 200b and a gain storage unit 202b.

The opto-electronic converter according to the second embodiment performs gain switching on a per-color basis in each column using the gain switch unit 20a and the gain switch unit 20b, thereby making effective use of dynamic range of each of the A/D converters 142. Pixels in the opto-electronic conversion unit 12a are arranged in a Bayer pattern.

Signals are read out from odd columns (denoted by 1, 3, . . . , and n−1 in FIG. 15) in the following order: R, G, R, G, . . . R, and G. Signals are read out from even columns (denoted by 2, 4, . . . , and n in FIG. 15) in the following order: G, B, G, B, . . . G, and B. In short, gains of the PGAs 140 that amplify signals output from the odd columns always differ from gains of the PGAs 140 that amplify signals output from the even columns.

Figure 16:
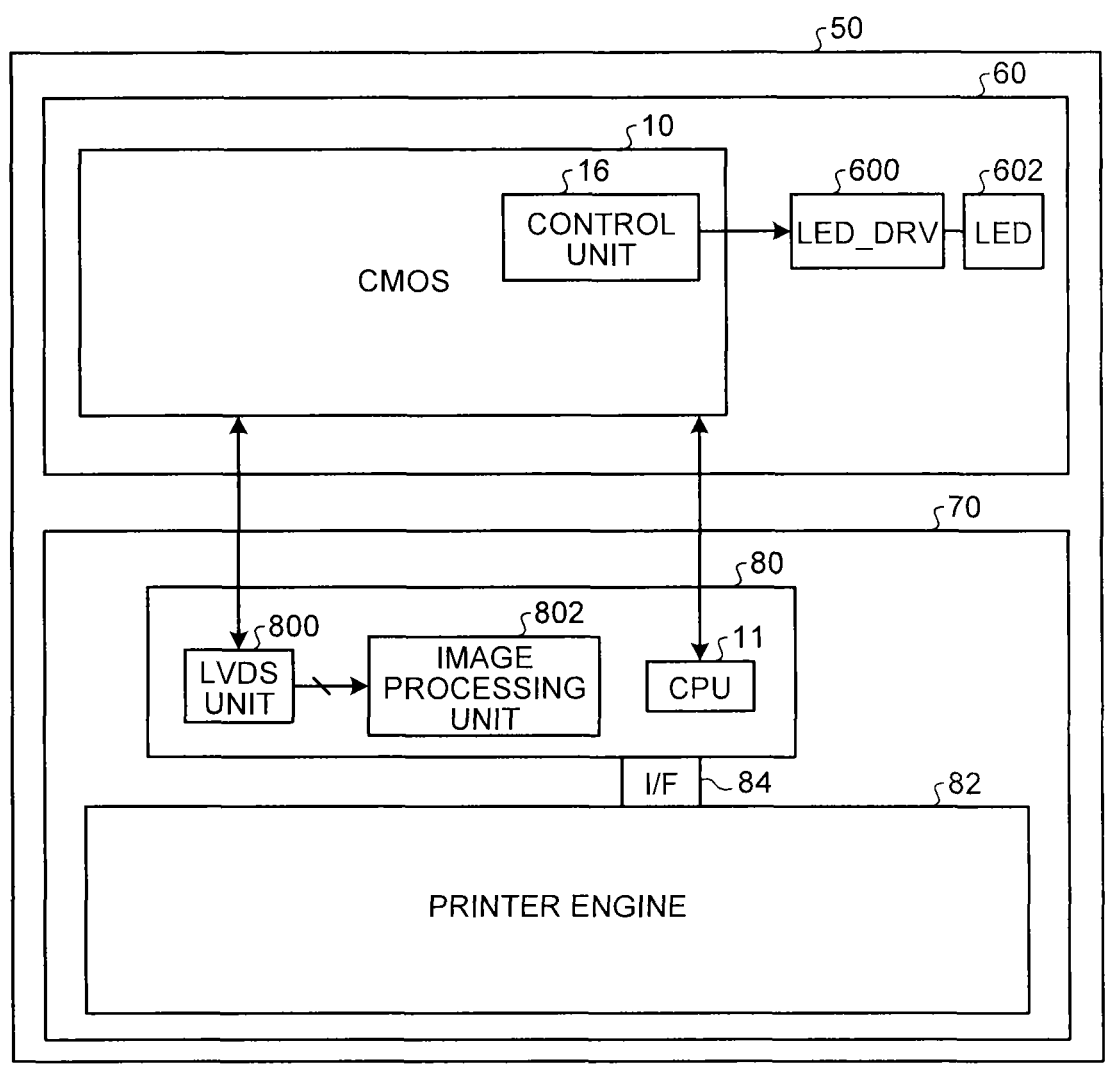
FIG. 16 is a diagram illustrating an overview of an image forming apparatus including an image reading device including the opto-electronic converter according to the first embodiment.

An image reading device including the opto-electronic converter 10 according to the first embodiment and an image forming apparatus including the image reading device are described below. FIG. 16 is a diagram illustrating an overview of an image forming apparatus 50 including an image reading device 60 including the opto-electronic converter 10. The image forming apparatus 50 may be, for example, a copier or an MFP (multifunction peripheral) including the image reading device 60 and an image forming unit 70.

The image reading device 60 may include the opto-electronic converter 10, an LED (light-emitting diode) driver (LED_DRV) 600, and an LED 602, for example. The LED driver 600 drives the LED 602 in synchronization with a line synchronizing signal output from the control unit 16, for example. The LED 602 irradiates an original document with light. The opto-electronic converter 10 operates such that, in synchronization with the line synchronizing signal or the like, a plurality of light-receiving elements (now shown) receives light reflected from the original document, generates charges from the received light, and starts accumulating charges. The opto-electronic converter 10 performs processing, such as parallel-serial conversion, on image data and outputs the processed image data to the image forming unit 70.

The image forming unit 70 includes a processing unit 80 and a printer engine 82. The processing unit 80 and the printer engine 82 are connected to each other via an interface (I/F) 84.

The processing unit 80 includes an LVDS (low voltage differential signaling) unit 800, an image processing unit 802, and the CPU 11. The CPU 11 executes program instructions stored in a memory (not shown) or the like, thereby controlling elements, including the opto-electronic converter 10, of the image forming apparatus 50.

The opto-electronic converter 10 outputs, for example, image data representing an image read by the image reading device 60, line synchronizing signals, transfer clocks, and the like to the LVDS unit 800. The LVDS unit 800 converts the received image data, the line synchronizing signals, the transfer clocks, and the like into 10-bit parallel data. The image processing unit 802 performs image processing on the converted 10-bit parallel data and outputs the processed image data and the like to the printer engine 82. The printer engine 82 performs printing using the received image data.

According to an aspect of the present invention, even if levels of signals output from a plurality of light-receiving elements included in a pixel group vary from one color to another of received light, the signal levels can be appropriately adjusted on a per-color basis.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An opto-electronic converter, comprising:
light-receiving elements configured to convert light of different colors into analog signals, each of the analog signals representing a pixel;
an amplifier circuit configured to amplify the analog signals, into which the light is converted by the light-receiving elements, in each pixel group, the pixel group including a plurality of the light-receiving elements; and
a gain switch circuit configured to switch, for each light-receiving element of the light-receiving elements included in the pixel group, a gain of the amplifier circuit to a predetermined gain that depends on a color of the light converted by the light-receiving element, the gain switch circuit switching the gain of the amplifier in accordance with a timing control signal received from a controller.

2. The opto-electronic converter according to claim 1, wherein the light-receiving elements are arranged in a single direction for each of the different colors of the received light.

3. The opto-electronic converter according to claim 1, further comprising an A/D conversion circuit configured to convert the analog signals amplified by the amplifier circuit into digital signals,
wherein the gain switch circuit switches the gain of the amplifier circuit for each of the light-receiving elements included in the pixel group so as to adjust to a dynamic range of the A/D conversion circuit.

4. The opto-electronic converter according to claim 1, further comprising a CDS circuit,
wherein when the amplifier circuit amplifies any one of an analog signal of a reset level output from the light-receiving element and an analog signal of a signal level output, as a result of converting light into an electrical signal, from the light-receiving element, the gain switch unit switches the gain by switching on or off a plurality of capacitors using switches, and
the CDS circuit performs correlated double sampling using the analog signal of the reset level amplified by the amplifier circuit and the analog signal of the signal level amplified by the amplifier circuit for each of the light-receiving elements.

5. The opto-electronic converter according to claim 4, wherein in a condition where gain switching is to be performed among three or more gains, the gain switch circuit switches the gain to the predetermined gain after temporarily switching the gain to a value close to a mean value of the three or more gains.

6. The opto-electronic converter according to claim 1, wherein the gain switch circuit includes
a plurality of capacitors differing from each other in capacitance, and
a plurality of switches respectively connected to an upstream side and a downstream side of the each of the capacitors, the switches being substantially identical in size, and
the gain switch circuit switches the gain by switching from one of the capacitors to another by substantially simultaneously switching on or off the switches respectively connected to the upstream side and the downstream side of each of the capacitors.

7. An image reading device comprising the opto-electronic converter according to claim 1.

8. An image forming apparatus comprising:
the image reading device according to claim 7; and
an image forming circuit configured to form an image based on image data obtained by the image reading device by performing reading.

9. The opto-electronic converter of claim 1, further comprising:
the controller, which is configured to generate and transmit the timing control signal to the gain switch circuit to switch the gain of the amplifier circuit.

* * * * *